UNITED STATES PATENT OFFICE.

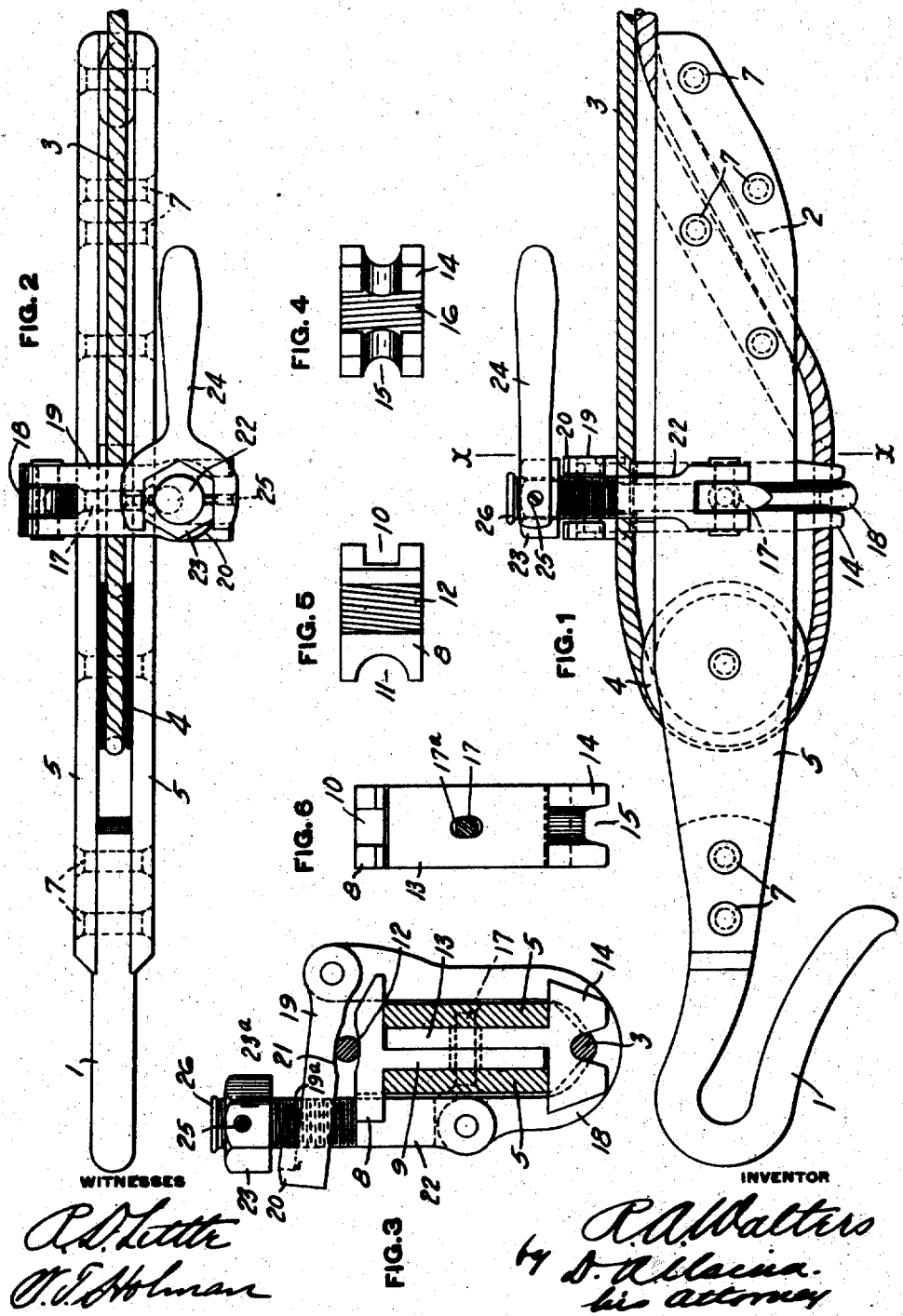

RALPH A. WALTERS, OF ROSSLYN FARMS BOROUGH, PENNSYLVANIA.

ADJUSTABLE WIRE-ROPE FASTENER.

1,233,939.

Specification of Letters Patent.

Patented July 17, 1917.

Application filed March 13, 1917. Serial No. 154,468.

*To all whom it may concern:*

Be it known that I, RALPH A. WALTERS, a citizen of the United States, and resident of Rosslyn Farms borough, in the county of Allegheny and State of Pennsylvania, have invented certain new and useful Improvements in Adjustable Wire-Rope Fasteners, of which the following is a specification.

The purpose of the present invention is the provision of novel means for securing a work engaging device, such as a hook, or the like, to a rope, cable or like part in an adjusted position, so as to prevent any slipping, and which will admit of ready and convenient adjustment in an expeditious and safe manner.

This invention is of especial value when the point of attachment of a hook, link or like parts, is required to be frequently and rapidly changed upon a rope, cable or similar carrying means.

The invention consists of a frame provided at one end with an engaging element, such as a hook, and having an inclined passage at its opposite end for the rope or cable, and provided intermediate its ends with a sheave or pulley and clamp, the latter being disposed between the said pulley and inclined passage.

The invention further consists of the novel features, details of construction and combinations of parts which hereinafter will be more fully set forth, claimed and illustrated in the drawings hereto attached, in which:—

Figure 1 is a side view of an adjustable work engaging device embodying the invention.

Fig. 2 is a plan of the apparatus of Fig. 1.

Fig. 3 is a transverse section, on the line *x—x* of Fig. 1.

Figs. 4 and 5 are opposite end views of the inner clamp members.

Fig. 6 is a side view of the inner clamp members.

Corresponding and like parts are referred to in the following description and indicated in the several views of the drawing by the same reference characters.

While the drawing illustrates a preferred embodiment of the invention, nevertheless it is to be understood that within the scope of the invention as claimed various changes in the form, proportion and minor details of construction may be resorted to without departing from the nature of the invention in the adaptation thereof to meet varying conditions and requirements.

The device comprises a frame which is elongated and has an engaging element at one end, which, as shown, has the form of a hook 1. This engaging element may be of any nature to meet the many trade requirements. An inclined passage 2 is provided at the opposite end of the frame for reception of a rope or cable 3 to which the device is to be adjustably attached. A sheave 4 is arranged intermediate the ends of the frame and is supported in the bight of the rope or cable 3. A clamp is mounted upon the frame between the sheave 4 and the passage 2 to secure the device upon the rope, cable or the like at the required adjusted position. This clamp will be described in detail hereinafter.

The frame may be of any construction and is shown as comprising two plates 5 which are spaced apart to receive the sheave 4. The filler 6, in which is formed the inclined passage 2, and the shank of the hook 1 serve to space the plates 5 apart the required distance to prevent any binding of the sheave 4. Suitable fastenings, as rivets 7, secure the plates 5 and the interposed fillers or spacing elements.

The clamp embodies inner and outer coöperating members and pressure creating means. The inner clamp members are of somewhat similar construction and have an oppositely disposed arrangement. One of the inner clamp members consists of a jaw 8 and a shank 9. The ends of the jaw 8 have notches 10 and 11 and its outer face is formed with a depression 12 therein which preferably is grooved or roughened to insure a firm grip on the cable 3.

The remaining inner clamp member consists of a shank 13 and a jaw 14. A groove 15 is formed in the ends and outer face of the jaw 14 and is of rounded form to conform to the rounded end of the outer clamp members of bow form. A transverse notch 16 is formed in the outer face of the jaw 14 intersects the groove 15 and receives the 
ɔr cable 3. The inner end of the notch 16 also is grooved or roughened to prevent the cable slipping.

The inner clamp members are disposed with their shanks 9 and 13 overlapping and between the plates 5 and with their jaws 8 and 14 crosswise of the frame and engaging opposite edges of the plates 5. A fastening 17 retains the inner clamp members in place and passes through registering openings 17ª formed in the plates 5 and shanks 9 and 13. The shanks 9 and 13 may also serve as spacing means to maintain the plates 5 apart the required distance. The strain upon the jaws 8 and 14 is adapted to be sustained wholly or in part by the plates 5 which are arranged between the ends thereof.

The outer clamp members consist of a U shaped member or bow 18 and a yoke 19. The bow has its members of unequal length and the yoke 19 is pivoted at one end to the long member of the bow. The closed end of the bow engages the groove 15 and coacts with the notched portion 16 of the jaw 14 to grip the rope or cable. The yoke 19 is forked at its free end and the forked members are formed with outwardly-extending projections 20. The inner face of the yoke 19 is depressed at 21 to enable a better grip to be obtained on the rope 3.

Pressure creating means form a part of the clamp and effect a gripping of the rope. These means consist of a bolt 22, pivoted at its inner end to the short member of the bow, and a nut 23 mounted on the threaded end of the bolt and adapted to engage the forked, free end of the yoke 19. The nut 23 is screwed downwardly on the bolt 22 until its lower face 23ª is in engagement with the surfaces 19ª of the forked end of the yoke 19 in clamping the device in adjusted position on the rope or cable. Outward swinging movement of the bolt 22 is prevented by engagement of the nut 23 with the projections 20 on the yoke. The nut may be turned in any manner and for convenience a handle 24 is pivotally attached to the nut 23 by means of screws 23 or other suitable fastenings. The outer end of the bolt 22 is upset, as shown at 26, to prevent loss of the nut after the parts are assembled.

When it is required to adjust the device upon the part 3 the clamp is loosened by backing off the nut 23 on the bolt 22 until in the position shown in Fig. 3. The rope will then run freely through the passage 2 and around the sheave 4. After the device has been moved to the required position, it is made secure by advancing the nut 23, thereby gripping the rope 3 in the manner stated.

Having thus described the invention, what I claim and desire to secure by Letters Patent of the United States, is:—

1. An adjustable device of the character specified embodying a frame having a passage at one end for receiving a rope, and having a work-engaging element at the opposite end, a sheave near the work-engaging end of the frame, and a clamp encircling the frame between the sheave and the said passage, said clamp having rope engaging jaws and means for binding the rope between the jaws, said means being arranged to bind the jaws on the frame.

2. An adjustable device of the character specified embodying a frame having an inclined passage at one end and a work-engaging element at the opposite end, a sheave carried by the frame, and a clamp disposed between the said passage and sheave and embodying rope gripping portions disposed upon opposite sides of the frame and means for tightening said gripping portions on the rope, said means being arranged to bind said clamp on the frame.

3. An adjustable device of the character specified comprising spaced plates, spacing elements secured between opposite end portions of the plates, one of the spacing elements having a passage and the remaining spacing element forming part of a work-engaging element, a sheave mounted between the plates, and a clamp arranged upon the plates between the sheave and the said passage.

4. A frame adapted to be adjustably supported in the bight of a rope, and a clamp for binding the said rope to the frame, said clamp embodying jaws at opposite points on the frame and means encircling the frame and jaws and arranged to bind the rope on the jaws and the jaws on the frame.

5. A frame adapted to be adjustably supported in the bight of a rope, and a clamp comprising opposed jaws for engaging the said rope upon opposite sides of the bight and coöperating clamp members, said clamp members binding the jaws on the rope and binding the jaws on opposite sides on the frame.

6. In a work-engaging device of the character specified, a frame embodying spaced parts, a clamp comprising opposed jaws disposed upon opposite sides of the frame and overlapped shanks arranged between the spaced parts of the frame and means encircling said frame and coacting with said jaws to clamp the jaws on the rope and bind the jaws on the frame.

7. In a device of the character specified, a frame embodying spaced parts, inner clamp members comprising overlapped shanks disposed between the spaced parts of the frame and opposed jaws having their terminal portions notched, a bow engaging the notched ends of the jaws and having one member longer than the other, a yoke pivoted at one end to the long member of the bow, a bolt pivoted on the short member of said bow, and a nut mounted upon the bolt and adapted to engage the free end of the yoke.

8. An adjustable device of the character specified embodying a frame having a passage at one end for receiving a rope and having a work-engaging element at its opposite end, a part engaging the bight of the rope near the work-engaging end of the frame and a clamp mounted upon the frame between said bight engaging part and the said passage.

In testimony whereof I have hereunto set my hand.

RALPH A. WALTERS.

Copies of this patent may be obtained for five cents each, by addressing the "Commissioner of Patents, Washington, D. C."